US010800501B2

(12) United States Patent
Okunishi

(10) Patent No.: US 10,800,501 B2
(45) Date of Patent: Oct. 13, 2020

(54) OUTBOARD MOTOR

(71) Applicant: SUZUKI MOTOR CORPORATION, Hamamatsu-shi, Shizuoka (JP)

(72) Inventor: Hiroki Okunishi, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

(21) Appl. No.: 16/425,586

(22) Filed: May 29, 2019

(65) Prior Publication Data

US 2020/0047866 A1 Feb. 13, 2020

(30) Foreign Application Priority Data

Aug. 9, 2018 (JP) ................................ 2018-150364

(51) Int. Cl.

| | |
|---|---|
| ***B63H 20/14*** | (2006.01) |
| ***B63H 23/00*** | (2006.01) |
| ***F16H 63/06*** | (2006.01) |
| ***B63H 23/30*** | (2006.01) |

(52) U.S. Cl.

CPC ............ *B63H 20/14* (2013.01); *B63H 23/30* (2013.01); *F16H 63/062* (2013.01)

(58) Field of Classification Search

CPC .... B63H 20/00; B63H 20/001; B63H 20/002; B63H 20/14; B63H 23/30; F16H 63/062; F01M 3/00; F01M 7/00; F01M 9/00; F01M 11/00; F01M 11/03

USPC ........................... 440/75, 76, 77, 88 R, 88 L

See application file for complete search history.

(56) References Cited

U.S. PATENT DOCUMENTS

| | | | | |
|---|---|---|---|---|
| 5,072,809 A * | 12/1991 | Shibata | F01M 1/12 | 123/196 R |
| 5,215,164 A * | 6/1993 | Shibata | F01M 1/12 | 123/196 A |
| 5,921,827 A * | 7/1999 | Ichihashi | F02B 61/045 | 123/195 P |
| 5,951,341 A * | 9/1999 | Rinzaki | F02B 61/045 | 440/77 |
| 5,970,926 A * | 10/1999 | Tsunoda | F01P 3/12 | 123/195 P |
| 6,450,847 B1 * | 9/2002 | Kashima | F01M 11/03 | 440/88 A |
| 7,162,985 B2 * | 1/2007 | Itoh | F01L 13/085 | 123/198 C |

(Continued)

FOREIGN PATENT DOCUMENTS

JP 2007-298093 A 11/2007

*Primary Examiner* — Daniel V Venne
(74) *Attorney, Agent, or Firm* — Stein IP, LLC

(57) ABSTRACT

There is provided an outboard motor. In a posture in use of the outboard motor, an oil filter is inclined such that a mounting portion side is located lower than a tip end side and the mounting portion side is located at an inner side and a tip end side is located at an outer side in the width direction of the outboard motor, a cover mating position between an upper engine cover and a lower engine cover is set to a position lower than an upper part of the tip end, and is higher than a lower part of the mounting portion, and an electric actuator is mounted on a lower part of an engine block and is mounted on a position closer to a center of the engine relative to a position of an outermost end of the oil filter in a width direction of the engine.

5 Claims, 9 Drawing Sheets

CL 16 UPPER RIGHT LEFT LOWER 24 23 10 M 25 26 51 60 41 42 40 54 50 3 53 30

(56) References Cited

U.S. PATENT DOCUMENTS

2003/0066711 A1* 4/2003 Saiga .................... F01M 11/03
184/6.5
2007/0254540 A1 11/2007 Miyashita et al. ............. 440/86

* cited by examiner 50
51
52
53
55
51d
54a
54b
54
54d
54e
54f
54c
60
60s

OUTBOARD MOTOR

CROSS-REFERENCE TO RELATED APPLICATIONS

The disclosure of Japanese Patent Application No. 2018-150364 filed on Aug. 9, 2018, including specification, drawings and claims is incorporated herein by reference in its entirety.

TECHNICAL FIELD

The present invention relates to an outboard motor on which an engine is mounted, and shift operation of which is performed by operating an electric actuator.

BACKGROUND

For example, Patent Document 1 discloses this type of outboard motor.

As described in Patent Document 1, a four-cycle engine is mounted on an upper part of an engine holder in the outboard motor. The periphery of the engine and the engine holder is covered with an engine cover. The engine cover includes an upper engine cover that covers the engine side and a lower engine cover that covers the engine holder side.

In particular, in the technology described in Patent Document 1, an electric actuator for performing shift operation is disposed on an upper part of the engine holder (see, for example, paragraph 0027 of Patent Document 1). In addition, an oil filter interposed in a circulation mechanism for engine oil is an essential component in a structure in the outboard motor, and the oil filter is mounted on the engine in a mounting posture in which a cylindrical axis is set to be horizontal in the technology described in Patent Document 1 (see, for example, FIG. 9 of Patent Document 1).

Patent Document 1: Japanese Patent Application Publication No. 2007-298093 A

In the outboard motor, it is important to miniaturize the outboard motor by reducing width of the outboard motor. In particular, a large-sized and high-power outboard motor is often operated with a plurality of outboard motors mounted on a ship (called multiple-motor suspending), and reducing the width of the outboard motor is an important point in practice. It is also important to ensure rigidity of the upper engine cover to reduce noise, and to improve the workability of attaching and detaching the engine cover.

That is, if the rigidity of the engine cover (in particular, the upper engine cover that tends to have a flat side surface) is not sufficient when the engine cover is increased in size (for example, having a size with a front-rear length of about 80 cm and a width of about 50 cm, such that the entire periphery of the engine cover is hard to be seen and there are places that is hard to be touched by hands when the engine cover is attached/detached by oneself), the engine cover may vibrate during operation and cause noise.

In addition, when the upper engine cover is increased in size and the rigidity thereof is not ensured, the upper engine cover is likely to deform when held by hands. Accordingly, it is difficult to attach/detach the upper engine cover to/from the lower engine cover. The rigidity of the engine cover generally increases as the thickness increases. However, the weight of the engine cover increases in accordance with the increase in the thickness, and workability of the large-sized and heavy engine cover during maintenance decreases.

A position of the tip end of the oil filter disposed at one side in the width direction of the outboard motor is likely to be a place where the width of the outboard motor (one side direction) is determined. On the other hand, the oil filter is desired to be disposed on a side portion of the outboard motor in consideration of workability during maintenance.

Further, it is also necessary to consider the mating position between the upper engine cover and the lower engine cover, in consideration of the ease of attachment/detachment work in which the interference with the engine cover is considered with regard to the attachment/detachment direction of the oil filter.

Further, it is desirable to lower the mating position between the upper engine cover and the lower engine cover when considering the prevention of interference between a tool and the lower engine cover during maintenance of the electric actuator. However, if the cover mating position is simply lowered, the height of the upper engine cover itself is increased accordingly. Therefore, the upper engine cover becomes tall and large, and it is difficult to reduce the weight and to ensure necessary rigidity.

SUMMARY

It is therefore at least one of objects of the present disclosure to provide an outboard motor on which an engine is mounted, and shift operation of which is performed by operating an electric actuator. The width of the outboard motor is reduced to miniaturize the outboard motor, and the rigidity of an upper engine cover thereof can be ensured and the weight of the upper engine cover can be reduced.

According to an aspect of embodiments of the present disclosure, there is provided an outboard motor including: an engine holder; an engine including an engine block mounted on an upper part of the engine holder; an oil filter for engine, mounted on one side of the engine in a width direction of the outboard motor; an electric actuator configured to operate a shift rod for shift operation via a link mechanism; and an engine cover that covers at least a part of the engine and a part of the engine holder.

In a posture in use of the outboard motor, the oil filter is inclined such that a mounting portion side of the oil filter is located lower than a tip end side of the oil filter in a mounting posture in which the mounting portion side is located at an inner side and the tip end side is located at an outer side in the width direction of the outboard motor.

The engine cover includes an upper engine cover that covers the engine side and a lower engine cover that covers the engine holder side. A cover mating position between the upper engine cover and the lower engine cover is set to a position that is lower than an upper part of the tip end of the oil filter, and is higher than a lower part of the mounting portion of the oil filter.

The electric actuator is mounted on a lower part of the engine block, and is mounted on a position closer to a center of the engine relative to the position of the outermost end of the oil filter in a width direction of the engine.

As described above, according to the present disclosure, the width of the outboard motor is reduced to miniaturize the outboard motor, and the rigidity of the upper engine cover can be ensured and the weight thereof can be reduced.

DETAILED DESCRIPTION OF THE EMBODIMENTS

Hereinafter, an embodiment of the present disclosure will be described with reference to the accompanying drawings as appropriate. It should be noted that the accompanying drawings are schematic. Therefore, it should be noted that a relationship between thickness and planar dimensions, ratios, and the like may be different from real ones. In addition, the embodiment described below exemplifies a device and a method for embodying the technical idea of the present disclosure, and the technical idea of the present disclosure does not specify the material, shape, structure, arrangement, and the like of components in the following embodiment.

Figure 1:
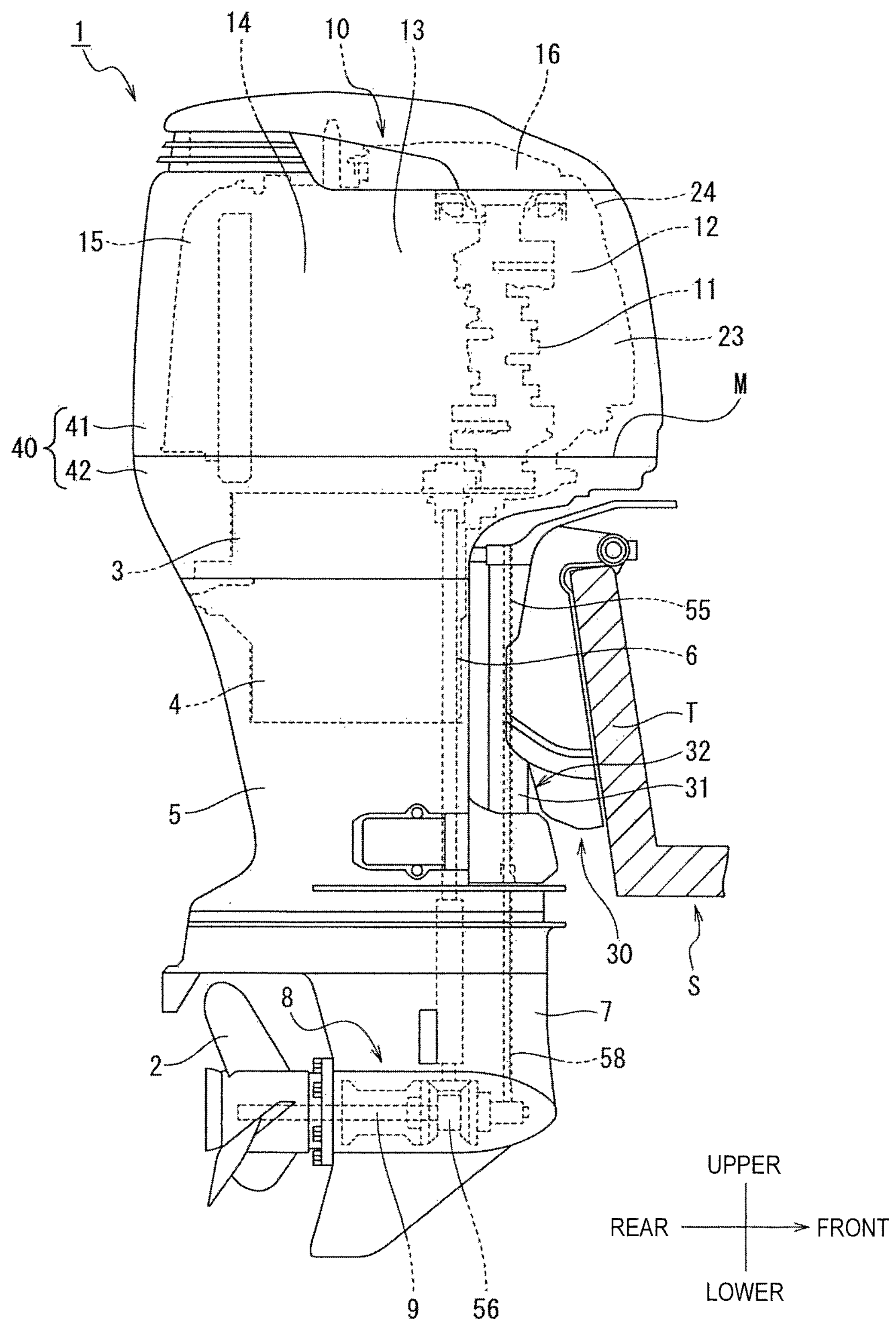
FIG. 1 is a typical right side view illustrating an embodiment of an outboard motor according to a mode of the present disclosure.

As illustrated in FIG. 1, a bracket device 30 is mounted on a ship S side of an outboard motor 1, and the outboard motor 1 is mounted on a transom T of a ship S via the bracket device 30. In the outboard motor 1 of the present embodiment, the ship S side is set as a front direction, a front side of FIG. 1 is set as a right side, and an upper-lower direction is referred to on the basis of a posture in use in which the outboard motor 1 is tilted down (state in FIG. 1). Hereinafter, the arrangement of each part in the posture in use of the outboard motor 1 will be described in detail.

As illustrated in FIG. 1, the outboard motor 1 includes an engine holder 3 at a substantially central portion of a motor body in the upper-lower direction. An oil pan 4 that stores lubricating oil is disposed below the engine holder 3. An engine 10 is provided on the upper part of the engine holder 3. The engine 10 is a four-cycle engine. The engine 10 of the present embodiment is a water-cooled four-cycle engine with four cylinders, in which a crankshaft 11 is disposed vertically (in an upper-lower direction), and a cylinder head 14 is disposed in a transverse direction (front-rear direction).

The periphery of the engine 10, the engine holder 3, and the oil pan 4 is covered with an engine cover 40. The engine cover 40 includes a lower engine cover 42 that covers the lower half of the engine 10 from the lateral side, and an upper engine cover 41 that covers the upper half of the engine 10 from the upper side of the lower engine cover 42. The lower engine cover 42 of the present embodiment is fixed to the engine holder 3, and the upper engine cover 41 is detachably mounted on the lower engine cover 42.

A drive shaft housing 5 is provided around and on the lower side of the oil pan 4. A drive shaft 6 serving as an output shaft of the engine 10 is disposed in the engine holder 3, the oil pan 4, and the drive shaft housing 5, and is substantially perpendicular to them.

A gear case 7 is provided on the lower side of the drive shaft housing 5. A clutch mechanism 8 is disposed in the gear case 7 in a posture in which an axis thereof is set to be horizontal. The drive shaft 6 extends downward in the drive shaft housing 5 and drives a propeller 2 via the clutch mechanism 8, a propeller shaft 9, and the like.

A shift rod 58 is connected to a position of an end portion on the front part of the clutch mechanism 8. A steering shaft 31 is pivotally supported by a swivel bracket 32 in the vertical direction in a rotatable manner. The swivel bracket 32 is provided on the bracket device 30. The steering shaft 31 is formed into a hollow shape, and a clutch rod 55 is inserted into the steering shaft 31. The clutch rod 55 is rotated in response to driving from an electric actuator 50.

The clutch rod 55 extends downward from a vicinity of the engine 10 and is connected to the shift rod 58 near a joint portion between the drive shaft housing 5 and the gear case 7. The shift rod 58 is operated by the rotation of the clutch rod 55 to drive a dog clutch 56 in an axial direction, thereby enabling shift switching for rotating the propeller shaft 9 forward or reversely.

Figure 2:
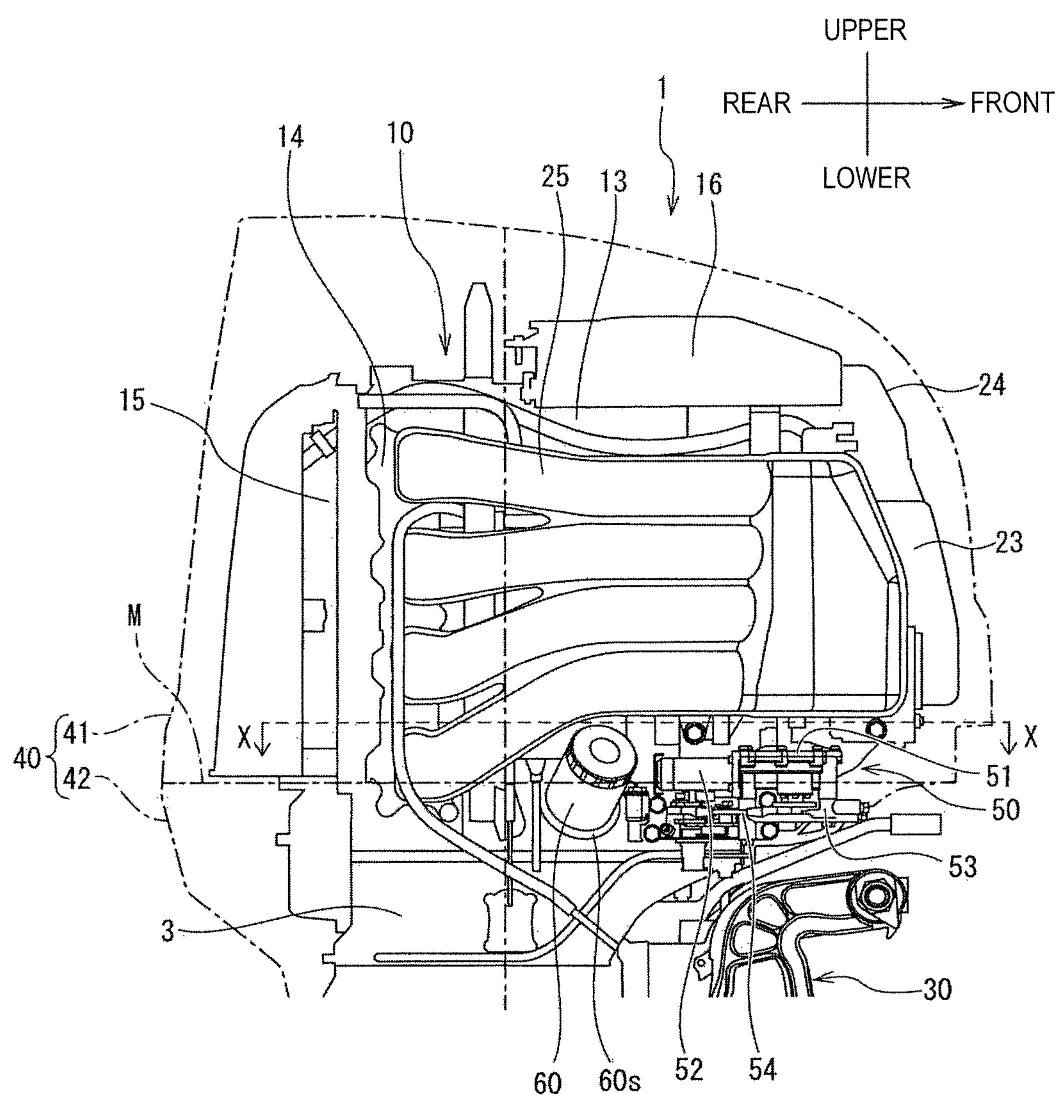
FIG. 2 is an enlarged view illustrating an engine portion, and a vicinity of an arrangement portion of an oil filter and an electric actuator in FIG. 1.
Figure 3:
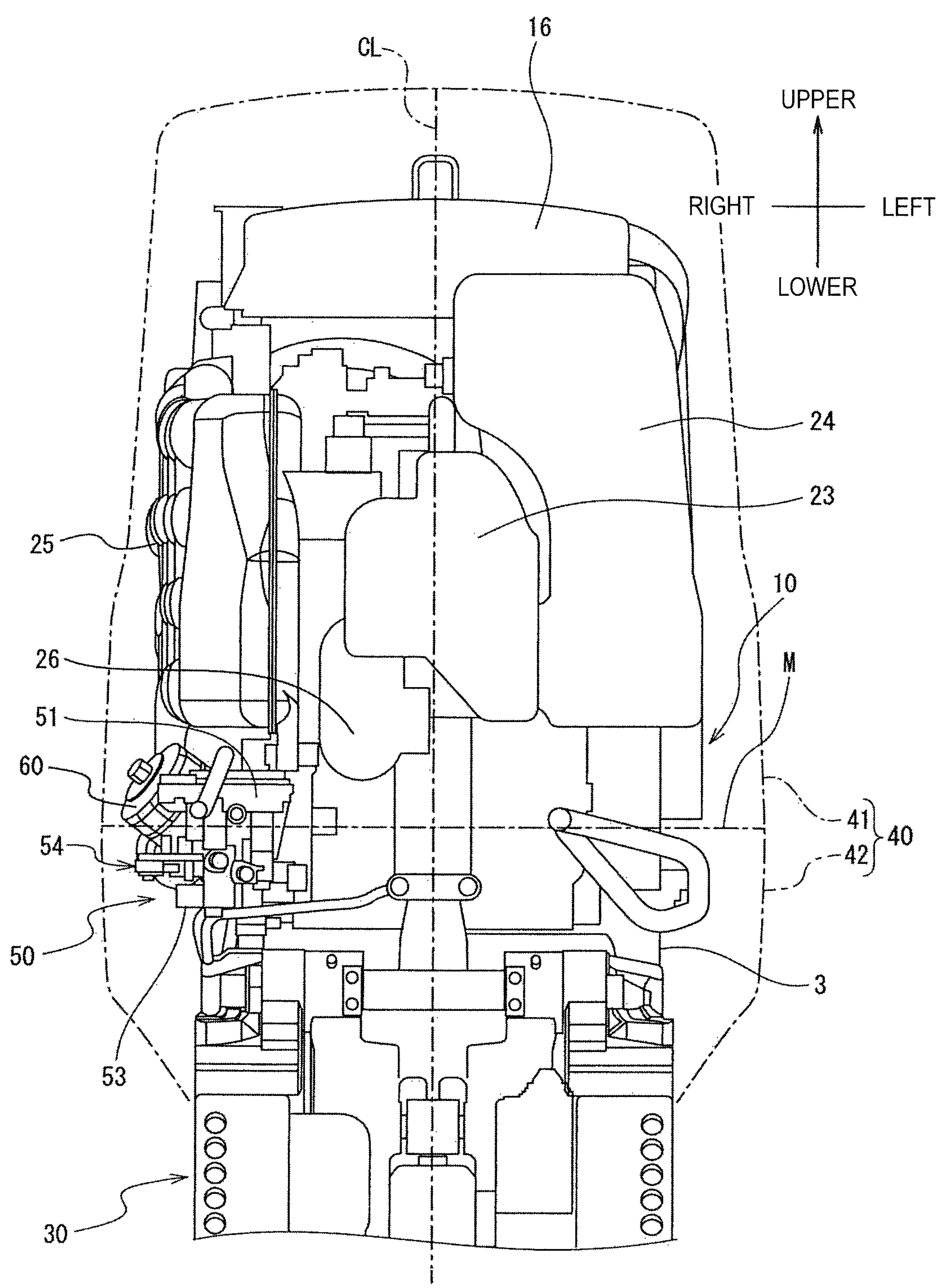
FIG. 3 is a front view of FIG. 2.
Figure 4:
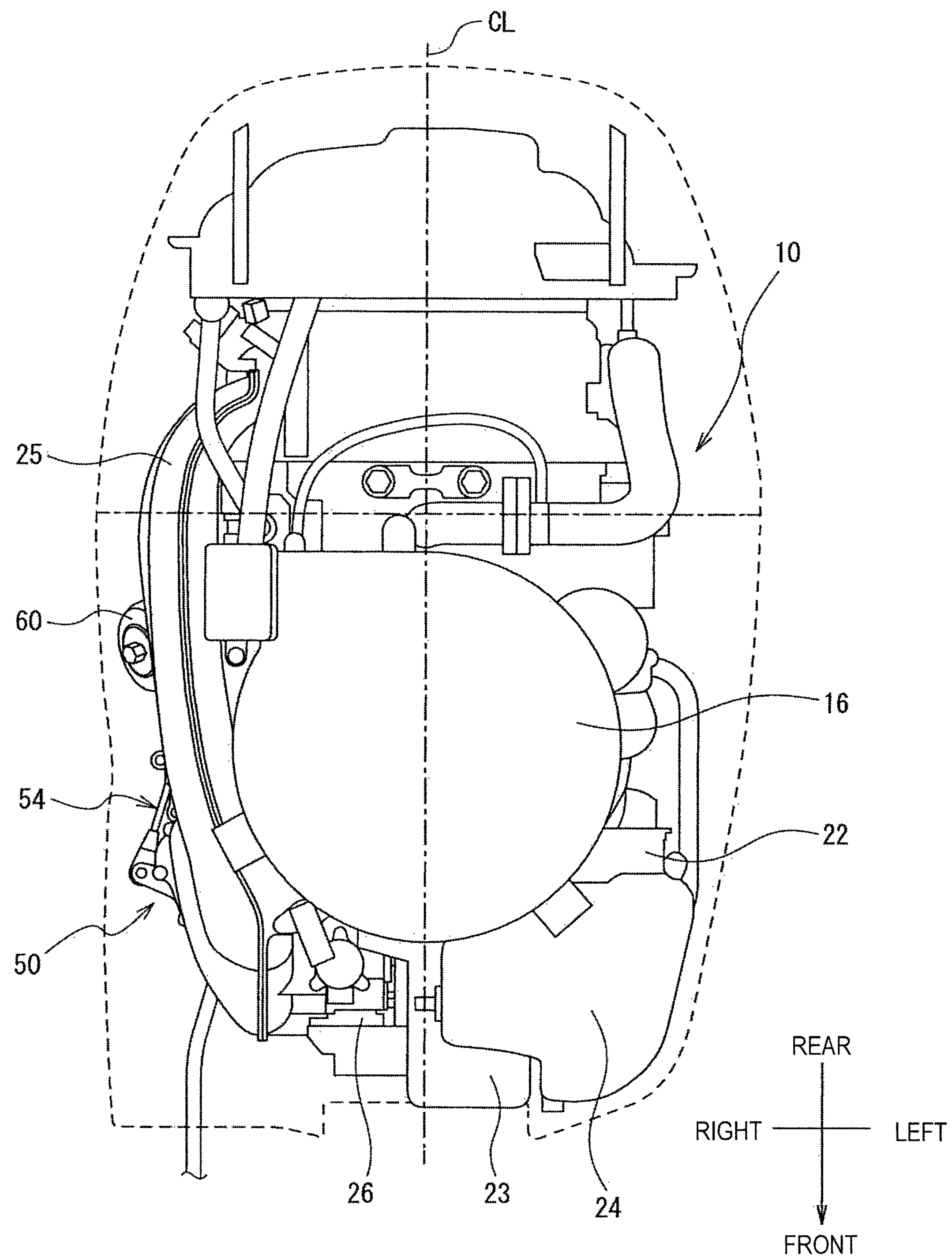
FIG. 4 is a top view of FIG. 2.
Figure 5:
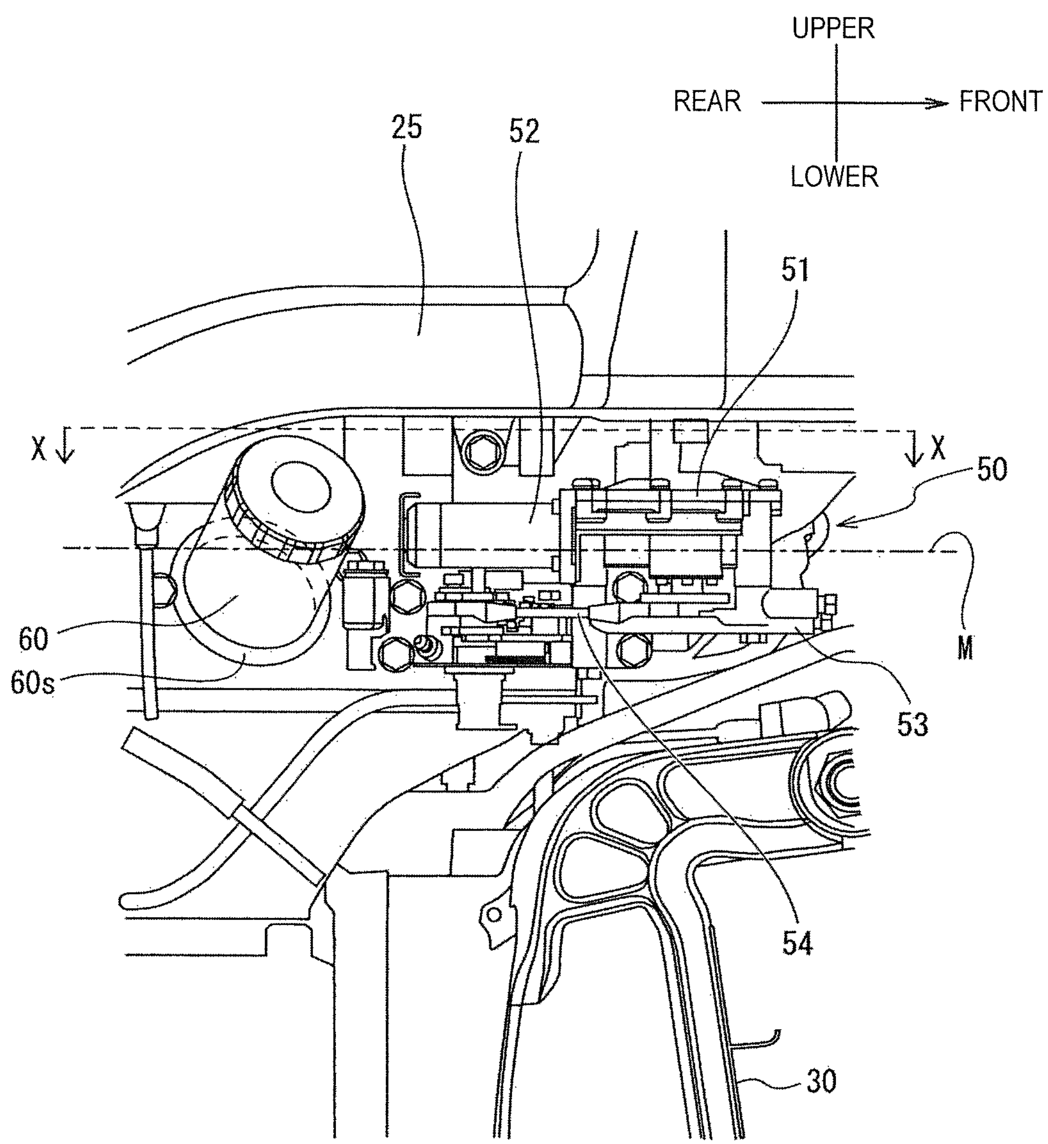
FIG. 5 is an enlarged view of a main part in FIG. 2.
Figure 6:
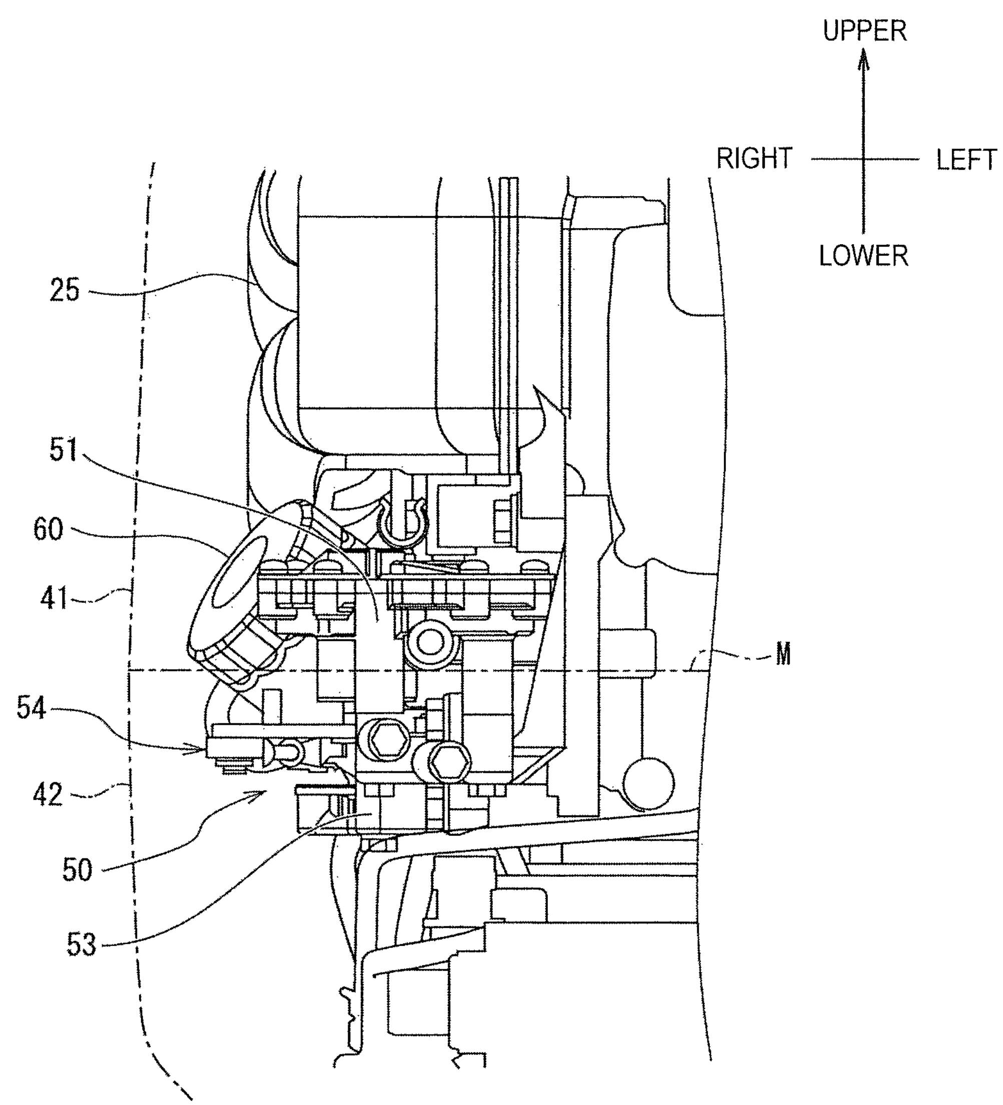
FIG. 6 is an enlarged view of a main part in FIG. 3.

As shown in enlarged views of main parts in FIGS. 2, 3, and 4, a suction manifold 22 and a surge tank 23 are provided in the front of the engine 10. A silencer box 24 is connected to an upstream side of the surge tank 23. An intake manifold 25 is provided on the right side of the engine 10, so as to cover the right side surface from the front side, and an intake system is constituted by the intake manifold 25, the suction manifold 22, the surge tank 23, and the silencer box 24.

In the engine 10, a cylinder block 13 is mounted on an upper side of the engine holder 3. In the posture in use of the outboard motor 1, a crankcase 12 is disposed in the front part, and the cylinder block 13 is disposed on the rear side relative to the crankcase 12. The crankshaft 11 (see FIG. 1) is pivotally supported by a joint surface of the crankcase 12 and the cylinder block 13.

A cylinder head 14 is provided on the cylinder block 13, and a rear part of the cylinder head 14 is covered with a cylinder head cover 15. Here, in the configuration of the present embodiment, a member including the crankcase 12, the cylinder block 13, and the cylinder head 14 corresponds to an "engine block".

A flywheel magneto cover 16 that covers a magnetic device (not illustrated) is mounted on the upper side of the crankshaft 11 (see FIG. 1). A starter motor and an electric box (not illustrated) are disposed in front of the crankcase 12. A ship S is provided with a remote control box for performing shift operation or throttle operation, and an operation signal is output from the remote control box to the electric box in response to operation of an operator.

In the outboard motor 1, an oil filter 60 is mounted on one side of the engine 10 in a width direction of the outboard motor 1. In the present embodiment, the oil filter 60 is disposed substantially at the center of the lower part of a right side surface of the cylinder block 13.

Here, in the oil filter 60 of the present embodiment, the oil filter 60 is mounted such that a mounting portion **60*s* side is located at the inner side of the outboard motor in the width direction, and a tip end side is located at the outer side of the outboard motor in the width direction in the posture in use of the outboard motor 1. Further, the mounting portion 60*s* is inclined to be lower than the tip end side in the width direction of the outboard motor 1**.

That is, the tip end of the oil filter 60 is mounted toward an oblique upper side of the outboard motor 1, and is detachably mounted on the cylinder block 13 from the oblique upper side. In the present embodiment, the tip end of the oil filter 60 is provided slightly toward the front side of the outboard motor 1.

In addition, the oil filter 60 of the present embodiment is disposed below the intake manifold 25. A position of a mating surface of the oil filter 60 and the engine 10 (that is, a mounting surface of the mounting portion 60*s* of the oil filter 60) is located closer to a center line CL of the outboard motor 1 in the width direction relative to a lateral end surface of the intake manifold 25 in the width direction of the outboard motor 1.

Further, a cover mating position M between the upper engine cover 41 and the lower engine cover 42 is set to a position that is lower than the upper part of the tip end of the inclined oil filter 60 and is higher than the lower part of the mounting portion 60*s*. In the present embodiment, the height of the cover mating position M between the upper engine cover 41 and the lower engine cover 42 is set to a height of the vicinity of the upper part of the mounting portion 60*s* of the oil filter 60 mounted in an inclined posture.

The upper engine cover 41 in the present embodiment has an integral structure. However, for example, a structure of the upper engine cover 41 may be considered, in which the upper engine cover 41 may be divided into two upper and lower parts, and the two parts are assembled such that the mating position in the engine cover 40 may be another position in addition to the cover mating position M. In addition, the structure of the engine cover 40 having various cover mating positions in addition to the above mating positions may be considered.

In the present disclosure, it is important that the mating position of the engine cover 40 exists at a position having the height of M. Therefore, the present disclosure can also be applied to an engine cover 40 having a structure in which the mating of the covers exists at the position having the height of M and the mating position of the cover also exists at other positions in the engine cover 40.

As shown in FIGS. 2 and 3, the electric actuator 50 for operating the shift mechanism is disposed on the front-right side of the engine 10. In the present embodiment, the electric actuator 50 is disposed in proximity to a rigging port (not illustrated) for inserting cables into the lower engine cover 42 in the vicinity of the mating position M between the upper engine cover 41 and the lower engine cover 42. A mechanism from the electric actuator 50 to the clutch mechanism 8 constitutes a shift device.

Figure 8:
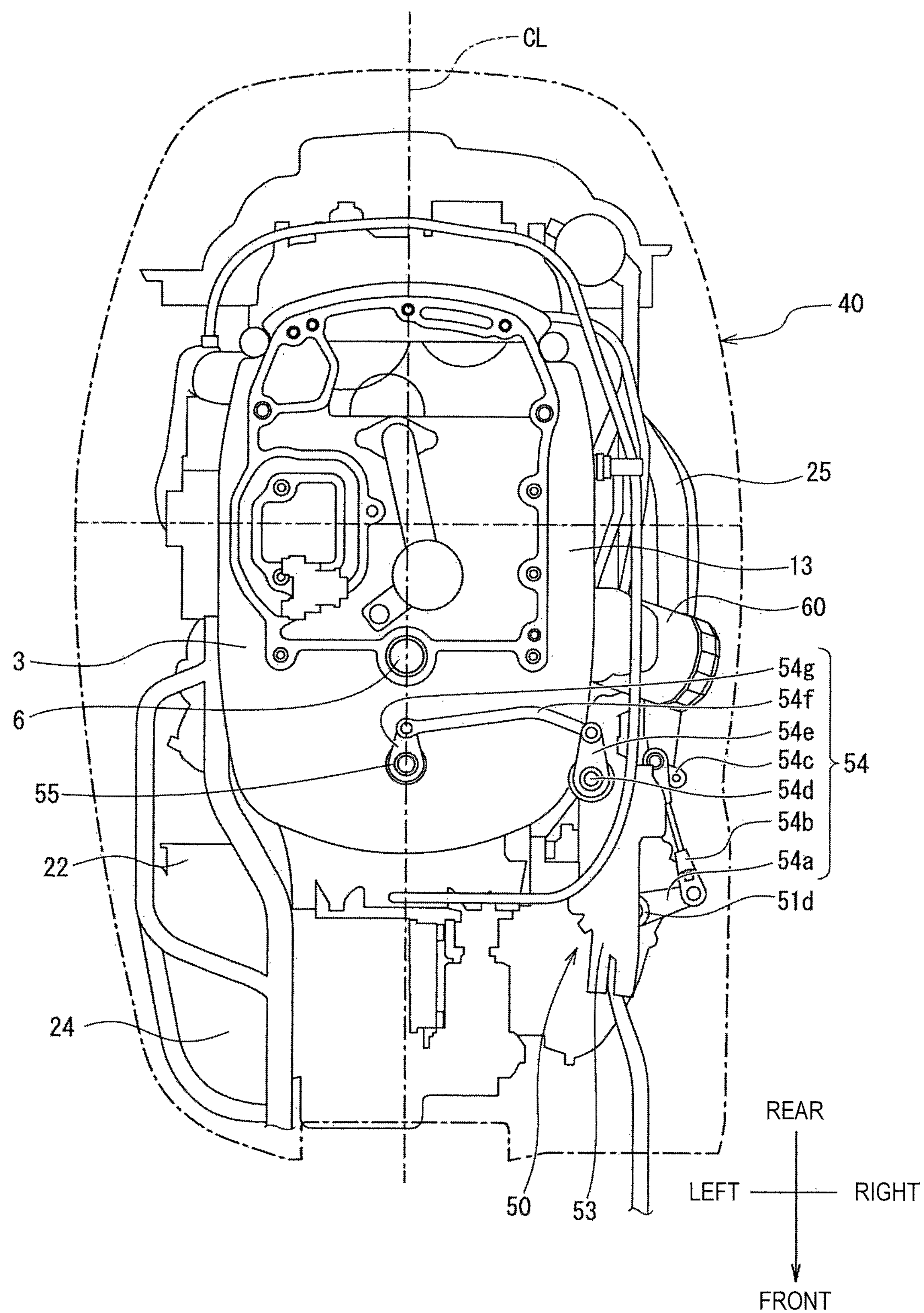
FIG. 8 is a view of an engine block broken at a joint surface with the engine holder as viewed from the back side.
Figure 9:
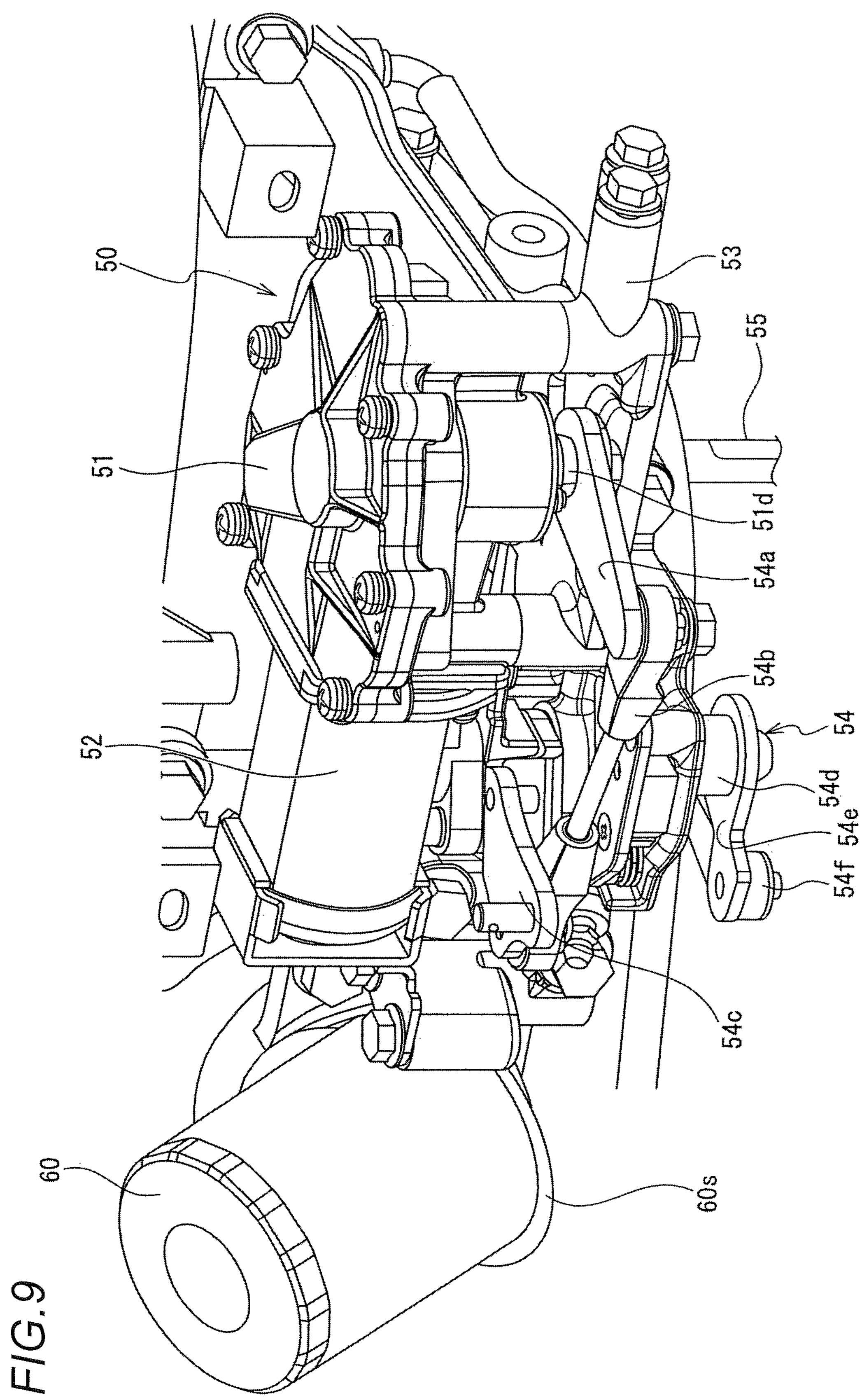
FIG. 9 is a perspective view of a main part illustrating an arrangement portion of an oil filter and an electric actuator.

As illustrated in FIGS. 8 and 9, the electric actuator 50 is mounted on the lower part of the cylinder block 13. The electric actuator 50 of the present embodiment includes an actuator body portion 51 having a built-in gear mechanism, and a cylindrical motor portion 52 provided on the rear part of the actuator body portion 51. A drive shaft 51*d* protrudes downward from the lower part of the center portion of the actuator body portion 51, and the drive shaft 51*d* is connected to a link mechanism 54 for shift operation.

The longitudinal direction of the cylindrical motor portion 52 is set to be substantially horizontal, and an axis of the motor portion 52 is toward the front-rear direction of the outboard motor 1, and the electric actuator 50 is mounted on the cylinder block 13 via a shift base 53. It should be noted that the electric actuator 50 may be mounted on the cylinder block 13 via the shift base 53 as described in the present embodiment, and the electric actuator 50 may be directly mounted on the cylinder block 13. The electric actuator 50 is not mounted on the engine holder 3 in either case, so that the engine holder 3 can be miniaturized.

In particular, the electric actuator 50 of the present embodiment is disposed adjacent to the oil filter 60, and the arrangement position of the electric actuator 50 is located closer to the center line CL of the outboard motor 1 in the width direction relative to the position of the tip end of the oil filter 60 in the width direction of the outboard motor 1.

Figure 7:
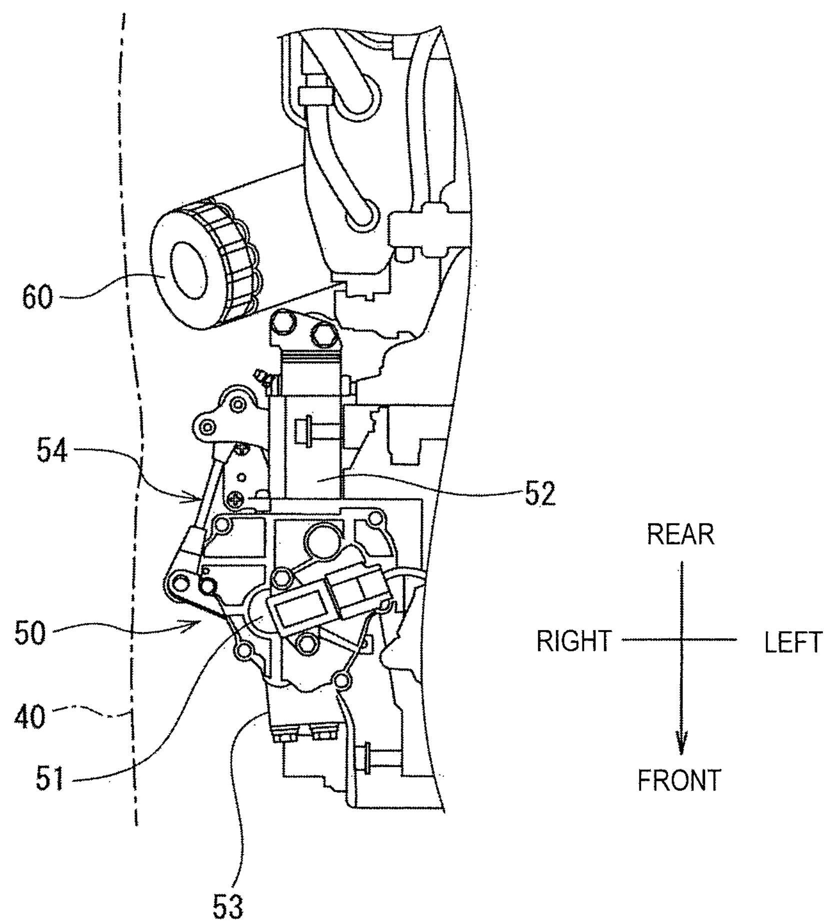
FIG. 7 is a view as viewed from a line X-X in FIG. 2 (or FIG. 5)

That is, when viewed from the front, a portion of the outermost end of the electric actuator 50 is disposed at a position that does not protrude outward relative to a portion of the outermost end of the oil filter 60 in the width direction. As illustrated in FIG. 7, in the link mechanism 54 for the shift operation, a plurality of swing arms and a plurality of links are stacked in the upper-lower direction of the outboard motor 1 on the upper side of the engine holder 3 so as to be interlocked with each other.

As illustrated in FIGS. 8 and 9, a first swing arm 54*a* in the link mechanism 54 of the present embodiment is connected to the drive shaft 51*d*. Further, a first link 54*b*, a second swing arm 54*c*, a vertical connection shaft 54*d*, a third swing arm 54*e*, a second link 54*f*, and a fourth swing arm 54*g* are connected in this order, and the fourth swing arm 54*g* is connected to the clutch rod 55. Accordingly, operation force of the electric actuator 50 output to the drive shaft 51*d* can be transmitted from the clutch rod 55 to the shift rod 58 via the link mechanism 54.

In particular, as shown in FIG. 4, the silencer box 24 is disposed on the other side of the center line CL of the outboard motor 1 in the width direction relative to the electric actuator 50 in the present embodiment. A throttle body 26 is disposed at a position between the silencer box 24 and the intake manifold 25, and the electric actuator 50 is disposed adjacent to the throttle body 26. In this arrangement, the electric actuator 50 is disposed so as not to protrude forward relative to the silencer box 24 and the throttle body 26 in the front-rear direction of the outboard motor 1.

Next, the actions and effects of the outboard motor 1 of the present embodiment will be described.

As described above, in the outboard motor 1 of the present embodiment, the mounting posture of the oil filter 60 is inclined so that the mounting portion 60*s* is lower than the tip end of the oil filter 60 in the width direction of the outboard motor 1 in the posture in use of the outboard motor 1. Therefore, the outboard motor 1 can be miniaturized in the width direction as compared with a case where the oil filter 60 is disposed in a horizontal posture in the width direction of the outboard motor 1.

Accordingly, an increase in the size of the upper engine cover 41 can be prevented according to the outboard motor 1 of the present embodiment. Therefore, due to the effects of weight reduction and size reduction, noise from the upper engine cover 41, the side surfaces of which are likely to be flat, can be reduced, and attachment/detachment workability is also improved.

Further, in the outboard motor 1 of the present embodiment, the mating position M between the upper engine cover 41 and the lower engine cover 42 is set to a position that is lower than the upper part of the tip end of the inclined oil filter 60, and is higher than the lower part of the mounting portion 60*s*.

Therefore, according to the outboard motor 1 of the present embodiment, interference with the engine cover 40 can be prevented during maintenance of the oil filter 60. The mating position M between the upper engine cover 41 and the lower engine cover 42 is lowered as much as possible, so that the weight of the upper engine cover 41 is reduced.

According to the outboard motor 1 of the present embodiment, the electric actuator 50 is mounted on the lower part of the cylinder block 13 constituting the engine block. Therefore, as compared with the configuration in which the electric actuator 50 is mounted on the engine holder 3, the mounting portion of the electric actuator 50 is unnecessary, and the engine holder 3 can be further miniaturized. In addition, it is likely to ensure a gap between the electric actuator 50 and the engine holder 3, so that drainage property is improved even if the electric actuator 50 and the engine holder 3 are covered with water.

In particular, according to the outboard motor 1 of the present embodiment, the electric actuator 50 is mounted closer to the center line CL of the outboard motor 1 in the width direction (closer to the center of the engine) relative to the upper part of the tip end of the oil filter 60 in the width direction of the engine 10. Accordingly, it is preferable to reduce dimension of the outboard motor 1 in the width direction so as to miniaturize the outboard motor 1.

Further, according to the outboard motor 1 of the present embodiment, the electric actuator 50 is disposed at approximately the same height as the upper part of the tip end of the oil filter 60 relative to the cover mating position M. Accordingly, it is likely to ensure maintainability of the oil filter 60 and the electric actuator 50.

With respect to the intake system arrangement of the outboard motor 1 of the present embodiment, the electric actuator 50 is disposed on the rear side relative to the front end portion of the silencer box 24 or the throttle body 26 in the front-rear direction of the outboard motor 1. Therefore, the outboard motor 1 is also made compact without waste in the front-rear direction, and is miniaturized to obtain a good layout.

In addition, according to the outboard motor 1 of the present embodiment, the axis of the cylindrical motor portion 52 constituting the electric actuator 50 is disposed substantially horizontally, and the height of the axis thereof is set to substantially the same as the height of the cover mating position M. Accordingly, the arrangement of the outboard motor 1 in the upper-lower direction is also made compact without waste. Therefore, the outboard motor 1 has a layout excellent in miniaturizing the outboard motor 1, and is excellent in improving the workability of the electric actuator 50 and improving the maintainability.

Further, according to the outboard motor 1 of the present embodiment, the link mechanism 54 for the shift operation is configured such that the plurality of swing arms and the plurality of links 54*a* to 54*g* are interlocked, and the plurality of swing arms and the plurality of links are stacked in the upper-lower direction at a position above the engine holder 3. Therefore, the outboard motor 1 is made compact without waste in the upper-lower direction and the left-right direction, so that a link arrangement extremely excellent in miniaturizing the outboard motor 1 is achieved.

As described above, according to the outboard motor 1 of the present embodiment, the dimension of the outboard motor in the width direction can be reduced to miniaturize the outboard motor, and it is likely to mount a plurality of outboard motors on the ship. The outboard motor 1 according to the present invention is not limited to the above-described embodiment, and various modifications can be made without departing from the spirit of the present invention.

What is claimed is:

1. An outboard motor comprising:

an engine holder;

an engine including an engine block mounted on an upper part of the engine holder;

an oil filter for engine, mounted on one side of the engine in a width direction of the outboard motor;

an electric actuator configured to operate a shift rod for shift operation via a link mechanism; and an engine cover including an upper engine cover that covers an engine side and a lower engine cover that covers an engine holder side, wherein when the outboard motor is in a tilted down position, the oil filter is inclined such that a mounting portion side of the oil filter is located lower than a tip end side of the oil filter in a mounting posture in which the mounting portion side is located at an inner side and a tip end side is located at an outer side in the width direction of the outboard motor, a cover mating position between the upper engine cover and the lower engine cover is set to a position that is lower than an upper part of the tip end of the oil filter, and is higher than a lower part of the mounting portion of the oil filter, and the electric actuator is mounted on a lower part of the engine block, and is mounted on a position closer to a center of the engine relative to a position of an outermost end of the oil filter in a width direction of the engine.

2. The outboard motor according to claim 1, wherein the engine includes an intake manifold provided at a position above the oil filter, and a silencer box provided at an opposite side of a side at which the oil filter is mounted across a center line of the outboard motor in the width direction of the outboard motor, and a throttle body is provided adjacent to the electric actuator between the intake manifold and the silencer box.

3. The outboard motor according to claim 2, wherein the electric actuator is disposed at a rear side relative to a front end portion of the silencer box or the throttle body in a front-rear direction of the outboard motor.

4. The outboard motor according to claim 1, wherein an axis of the electric actuator is disposed substantially horizontally, and a height of the axis is substantially equal to a height of the cover mating position.

5. The outboard motor according to claim 1, wherein the link mechanism is configured such that a plurality of swing arms and a plurality of links are interlocked, and the plurality of swing arms and the plurality of links are stacked in an upper-lower direction at a position above the engine holder.

* * * * *